United States Patent [19]

Koch

[11] 3,914,146

[45] *Oct. 21, 1975

[54] POLYESTER HOSE AND PREPARATION THEREOF

[75] Inventor: Robert B. Koch, Reading, Pa.

[73] Assignee: Rilsan Corporation, Glen Rock, N.J.

[ * ] Notice: The portion of the term of this patent subsequent to Jan. 22, 1992, has been disclaimed.

[22] Filed: Feb. 19, 1974

[21] Appl. No.: 443,452

[52] U.S. Cl. ............... 156/149; 138/125; 138/129; 156/172; 156/276; 156/307; 427/180
[51] Int. Cl.² ............................................. B29D 23/00
[58] Field of Search ........... 156/149, 148, 143, 144, 156/172, 306, 307, 169, 283, 284; 138/123–127, 129, 130, 141, 144; 117/16, 18, 21, 47 A

[56] References Cited
UNITED STATES PATENTS

| | | | |
|---|---|---|---|
| 2,977,839 | 4/1961 | Koch | 156/149 |
| 3,251,381 | 5/1966 | Koch | 138/125 |
| 3,253,619 | 5/1966 | Cook | 156/149 |
| 3,334,165 | 8/1967 | Koch | 156/149 |
| 3,790,419 | 2/1974 | Atwell et al. | 156/149 |

*Primary Examiner*—Charles E. Van Horn
*Assistant Examiner*—F. Frisenda
*Attorney, Agent, or Firm*—Burgess, Ryan and Wayne

[57] ABSTRACT

A polyester hose is provided including a process for the preparation thereof. In the process, a polyester tubing is contacted with a solution of a selected organic material and the treated tubing is then reinforced with a synthetic or natural fiber followed by subjecting the reinforced tubing to an elevated temperature of at least about 150°F.

32 Claims, No Drawings

POLYESTER HOSE AND PREPARATION THEREOF

BACKGROUND OF THE INVENTION

Various procedures have been described in the literature for producing an all-nylon textile-reinforced plastic hose by plasticizing the surface of nylon tubing and then applying to the plasticized surface of the plastic hose, while plasticized, a braided nylon textile reinforcement. The reinforced tubing is then passed through a water bath so as to remove the plasticizing agent, the resulting material is then subjected to heat and this is followed by immediately extruding a nylon covering over the plasticized surface of the braided material. This procedure is disclosed in Koch U.S. Pat. No. 2,977,839.

Atwell U.S. Pat. No. 3,682,201 discloses a similar textile-reinforced all polymeric hose which is considered to be as good as the hose disclosed in the aforesaid Koch Patent. In said U.S. Pat. No. 3,682,201, the procedure used is very similar to that described in the Koch Patent mentioned supra in that one or more circular knitted layers of thermoplastic, such as, for example, nylon, textile reinforcing elements, and the like, are disposed around a thermoplastic (e.g. nylon) innertube. The knitted layer adjacent the inner tube is fused to the outer surface of the tube at the inner face therebetween and the succeeding knitted layers are fused to one another. The fusion is preferably achieved by plasticizing the thermoplastic components to be bonded together by using a resorcinol-water solution or other agent capable of plasticizing the thermoplastic material of the components to be bonded together, maintaining the aforesaid components in contact with one another and in a relatively immobilized position while they are so plasticized until fusion bonding takes place. The plasticizing agent is then removed, usually by use of a solvent and the plasticizing action is thereby stopped.

In the procedures described in both the Koch and Atwell et al. Patents, the solvation or plasticization of the tubing is required prior to the applying of the fiber. Thus, the nylon which is being solvated has a preference for resorcinol and consequently, there is a continually changing concentration of the solvating bath. As a result, it is extremely difficult to control the process. Further, in the aforesaid prior procedures, the solvated surface is very pliable and is pushed up through the interstices of the fiber and this can cause serious deterioration of the fiber through excess solvation of the fiber especially when the fiber is nylon.

SUMMARY OF THE INVENTION

In accordance with the present invention, a method has been developed for preparing a new and improved hose construction wherein a polyester tubing is treated with a solution of an organic material having specified characteristics, the treated tubing is then reinforced with a synthetic or natural fiber followed by subjecting the reinforced tubing to a temperature of at least about 150°F.

The resulting tubing of the present invention is especially adapted for pressure service such as, for example, in hydraulic, pneumatic, refrigeration, air conditioning and other like applications.

In the present process, a crystalline material having specified characteristics is dissolved in a suitable solvating agent such as, water, acetone, alcohol, and the like, and then applied as a thin coating as, for example, by procedures such as spraying or by immersion of the polyester tubing in the solvating agent. A suitable reinforcing material which is either a synthetic or natural fiber is then wrapped, braided or helically wound around the tubing so treated. The reinforced structure is then subjected to an elevated temperature, that is, a temperature in excess of about 150°F thereby causing solvation of the polyester tubing to produce the desired product.

Illustrative of suitable polyesters tubing are HYTREL (trademark), elastomeric polyesters, products of the Du Pont Company. HYTREL polymers are a class of thermoplastic elastomers. These substances are fully polymerized, high molecular weight, non-reactive thermoplastic esters which exhibit many of the desirable characteristics of cross-linked elastomers combined with unusual heat and chemical stability. HYTREL is resistant to hydrolysis by steam and hot water and to attack by mildew and fungus. These substances are not dissolved by highlypolar solvents such as esters, ketones, cyclic ethers and amides. HYTREL polymers are highly resistant without standing resistance to flexing at both low and high temperature extremes. Low temperature properties are excellent; the brittle temperatures are below minus 90°F with only moderate increases in stiffness at temperatures as low as minus 65°F. The harder polymers have unusually high hot strength at temperatures of 300°F and above. The tensile strengths of specimens taken from finished goods will run upwards of 5000 to 7000 psi. HYTREL stretches rather grudgingly under moderate stress (up to 1000 psi).

The selected organic materials used in the present process are solid organic compounds which are crystalline at ambient temperatures having melting points between 40° and 180°C and are capable of solvating the surface of the polyester resins. The substances are further characterized in that they have an acidic hydrogen ion and their solubility is at least about 20%, by weight, in a volatile solvent. Illustrative of such organic materials are resorcinol, catechol, glutaric acid and naphtho resorcinol, including mixtures thereof.

It has been found that prior to contacting the polyester tubing with a solution of the aforesaid organic material said tubing should be cleaned so as to prevent contamination of said solution. Suitable cleaning agents include, for example, various alcohols such as methanol, ethanol and the like.

In the present process, the selected organic material and suitably, crystalline resorcinol, is dissolved in a suitable solvating agent such as, for example, water, acetone, a lower alkanol such as, for example, methanol, ethanol, and the like, or mixtures thereof. When a selected organic material and illustratively, resorcinol, is dissolved in an alcohol solution, as little as about 20% or as much as about 75% of the alcohol solution can be used and suitably, equal amounts by weight, of resorcinol and methanol. Another suitable solvating agent is a 25% aqueous and a 25% alcohol solution. It is desirable to add to the solvating agent, a wetting agent such as Triton X-100 manufactured by E.I. DuPont or Tergitol, manufactured by the Union Carbide Corporation. However, such a wetting agent is unnecessary when an alcohol such as methanol or ethanol is used as the solvating agent.

The polyester tubing such as, for example, HYTREL tubing, is immersed and passed through a bath of the organic material and illustratively, resorcinol, leaving on the tubing, a thin layer of the solvated resorcinol. It is generally desirable that the tubing should be withdrawn in a vertical direction. The thin film which is developed on the surfaces of the tubing material can be dried suitably by a warm air blast at a temperature varying between about 75° and 120°F. When an alcohol is used as the solvating agent for resorcinol, the drying time is considerably reduced and particularly when methanol is used, because of its low boiling point, the methanol will evaporate rapidly. Consequently, methanol is deemed to be one of the more suitable solvating agents for resorcinol. Following the drying step, a thin layer of crystalline resorcinol is left on the surface of the polyester tubing.

A reinforcing member is then applied to the polyester tubing by conventional procedures such as, for example, by wrapping, braiding or helically winding said reinforcing member around the tubing. Suitable reinforcing materials include, for example, natural fibers such as cotton, or synthetic materials such as, for example, rayon, polyesters, that is, poly (ethylene terephthalate) such as "Dacron" (trademark) or "Terylene" (trademark); vinyl resins such as, for example, polyvinyl chloride or copolymers of vinyl chloride and vinyl acetate such as "vinyon"; acrylic plastics such as those which are largely based on acrylonitrile, such as, for example, "Dynel" (trademark), "Orlon" (trademark), "Acrilan" (trademark) and "Creslan" (trademark); vinylidene chloride polymers and copolymers such as "Saran" (trademark); polyolefins such as polypropylene, and the like, as well as mixtures of the aforesaid natural and synthetic fibers. There can also be used, as reinforcing material, various polyamides such as nylon 66, (polyhexamethylene adipamide), nylon 11, nylon 12, nylon 6 (polymerized epsilon caprolactam), as well as copolymers of the aforesaid nylons, and the like.

The resulting reinforced assembly is heated to an elevated temperature that is, to a temperature of about 150°F or higher thereby causing solvation of the polyester tubing. When the reinforcing material is a nylon, a chemical bond is created; where the reinforcing material is a fiber other than nylon, an encapsulation is developed in the fiber resulting in excellent adherence to the polyester tubing.

It has been found that a solution containing 40 parts resorcinol and 40 parts ethanol or methanol, by weight, will deposit a coating of about 1.5 mils (0.0015inch) on the surface of the polyester tubing. It has also been established that a solution of 30 parts by weight methanol and 40 parts by weight resorcinol produces a coating of resorcinol on the tubing of about 2.0 mils (0.002inch) thick.

An alternative procedure that can be used involves passing a dry mixture of the polyester and a crystalline organic material and suitably, resorcinol, through an extruder whereby a thin film of the material covers the polyester tubing. After this coating has solidified, as by cooling, the reinforcing material can be applied over the outside diameter of the coating and the resulting assembly is then passed through a heating chamber. This results in softening of the coating thereby allowing it to encapsulate the natural or synthetic fiber. The coating will also solvate the polyester and produce a chemical bond. A suitable mixture of resorcinol and a polyester such HYTREL, comprises 40 parts resorcinol and 30 parts of said polyester, by weight.

The present process of bonding is far superior to the procedures described in the aforesaid U.S. Pat. Nos. 2,977,839 and 3,682,201. The prior art procedures require solvation or plasticization of the tubing prior to the application of the fiber. Consequently, the polymer which is being solvated has a preference for resorcinol and there is a continually changing concentration of the solvating bath making it extremely difficult to control the process. However, the present process is characterized by the fact and distinguishable from the prior art procedures described above in that substantially no solvation occurs prior to the application of the natural or synthetic fiber to the polyester tubing. Consequently, the concentration of the bath remains constant and as a result, there is deposited on the polyester tubing a uniform thickness of the organic material. Another advantage characterizing the present process is that the crystals of the organic material cannot be pushed up into the interstices of the natural or synthetic fiber when they are applied and this is unlike the prior art procedures wherein the solvated surface is very pliable and is pushed up through the interstices of the fiber. This causes, in some cases, serious deterioration of the fiber through excessive solvation of the fiber.

The following Examples illustrate the preferred techniques for preparing reinforced tubing. Unless otherwise specified, all parts and percentages are given by weight and all temperatures are in degrees Fahrenheit.

EXAMPLE 1

Continuous HYTREL tubing ¼ inches (I.D.) and 5/16 inches (O.D.) is quickly passed through a methanol bath which is approximately 12 inches in length. The exposure time in the passage of the tubing through the bath is about 15 seconds. The polyester tubing is then immersed for a period of 6-7 seconds in a bath 6 inches in length containing a solution of 40 parts by weight resorcinol and 30 parts by weight methanol, at room temperature. The treated tubing is then withdrawn vertically from the bath thereby obtaining an even coverage of resorcinol around the circumference of the tubing. The tubing is then subjected to warm air whereby a crystalline film of resorcinol is deposited on the outside diameter of the tubing.

There is then applied to the dried tubing a synthetic fiber such as nylon 66 by use of a 24 Carrier Wardwell Braiding Machine using 2400 denier film at 11 picks inch to obtain a reinforced hosing material. An excellent bond is obtained.

The hose thus obtained had a burst strength of about 4500 psi.

EXAMPLE 2

The procedure of Example 1 was followed except that a rayon was applied to the polyester tubing.

The resulting hose had a burst strength of about 5000 psi.

EXAMPLE 3

Following the procedure of Example 1 except for the replacement of resorcinol by catechol and the use of 40 grams of methanol, there is obtained a fairly good bond. A similar result is obtained when naphtho resorcinol is used. The same result is obtained when glutaric acid is used.

In applying the reinforcing material to the polyester tubing, it may at times, be desirable to apply more than one layer of the reinforcing material. This can be brought about by simply repeating the present procedure as described above. Specifically, the single layered reinforced tubing is contacted with a suitable resorcinol solution or particulare resorcinol to obtain a coating of crystalline resorcinol thereon and this is followed by subjecting the reinforced tubing to an elevated temperature. Alternatively, a dry mixture of the polyester and crystalline resorcinol is passed through an extruder thereby providing a thin film of resorcinol on the reinforced tubing or hose. This is followed by the application of heat to the reinforced tubing.

It is possible and at times desirable to apply to the single layered or multi-layered reinforced tubing or hosing, a suitable covering material such as a polyamide or a neoprene rubber. Such a covering is applied by using the technique herein described that is, contacting the reinforced tubing with a resorcinol solution or particulate resorcinol so as to deposit on said reinforced tubing, a thin layer of resorcinol. Alternatively, the extrusion procedure described above can be used to obtain a polyester tubing having a coating which is comprised of a mixture of the polyester and resorcinol. There is then applied to the tubing obtained by either of the above procedures, a polyamide covering or a neoprene covering and then subjecting this assembly to heating at an elevated temperature that is, at temperatures in excess of about 150°F so as to bond the cover onto the single or multi-layered reinforced tubing.

I claim:

1. A process for the preparation of a reinforced hose construction which comprises contacting a polyester tubing with a solution of an organic material selected from the group consisting of resorcinol, catechol, glutaric acid and naphtho resorcinol, or a mixture thereof, drying said solution to form a crystalline material on the surface of said tubing, reinforcing said tubing with at least one layer of a synthetic or natural fiber followed by subjecting the reinforced tubing thus obtained to a temperature of at least about 150°F.

2. A process according to claim 1 wherein the organic material is resorcinol.

3. A process according to claim 1 wherein the organic material is catechol.

4. A process according to claim 1 wherein the organic material is naphtho resorcinol or glutaric acid.

5. A process according to claim 1 wherein the tubing treated with the organic material is dried.

6. A process according to claim 1 wherein the solution of the organic material is an aqueous or an alcoholic solution.

7. A process according to claim 6 wherein the alcohol is an alkanol containing from 1 to 4 carbon atoms.

8. A process according to claim 1 wherein the solution of the organic material is a substantially equal mixture of resorcinol with a methanol or ethanol, by weight.

9. A process according to claim 1 wherein the polyester is a elastomeric polyester compound or a mixture of said elastomeric polyester compounds.

10. A process according to claim 1 wherein the natural fiber is cotton and the synthetic fiber is a member selected from the group consisting of nylon 6, nylon 66, a polyester and rayon, and mixtures thereof.

11. A process according to claim 1 wherein the polyester tubing is treated with an alkanol containing from 1 to 4 carbon atoms prior to contacting with the solution of the organic material.

12. A process according to claim 1 wherein a mixture of the polyester and said organic material is extruded to obtain a thin coating on the resulting polyester tubing followed by applying the reinforcing synthetic or natural fiber to said tubing and then subjecting the resulting assembly to a temperature of at least about 150°F.

13. A process according to claim 1 wherein the reinforced product is contacted with a resorcinol solution or resorcinol in particulate form followed by applying at least one additional coating of a synthetic or natural fiber reinforcing material and then subjecting the resulting assembly to a temperature of at least about 150°F.

14. The product obtained by the process of claim 1.
15. The product obtained by the process of claim 9.
16. The product obtained by the process of claim 12.
17. The product obtained by the process of claim 13.

18. A process according to claim 1, which comprises contacting a single or a multi-layered reinforced tubing with a resorcinol solution or resorcinol in particulate form, applying a covering selected from the group consisting of a polyamide, copolyamide, a polyester of a neoprene on to said treated reinforced tubing followed by heating the resulting assembly at a temperature in excess of about 150°F.

19. The product obtained by the process of claim 18.

20. A process according to claim 12, wherein the reinforced product is contacted with a coating comprising an extruded product of a polyamide, a polyester or a copolyamide and resorcinol, applying thereon at least one additional layer of a synthetic or natural fiber or reinforcing material and then subjecting the resulting assembly to a temperature of at least about 150°F.

21. A process according to claim 12 which comprises contacting a single or multi-layer reinforced tubing with a coating comprising an extruded product of a polyamide, a polyester or copolyamide and resorcinol, applying a covering thereon selected from the group consisting of a polyamide, copolyamide, a polyester or a neoprene followed by heating the resulting assembly at a temperature in excess of about 150°F.

22. The product obtained by the process of claim 20.
23. The product obtained by the process of claim 21.

24. A process according to claim 13 wherein the additional layer is applied to the reinforced product by wrapping, braiding or helically winding said layer around or on said reinforced product.

25. A process according to claim 18 wherein the additional layer is applied to the reinforced product by wrapping, braiding or helically winding said layer around or on said reinforced product.

26. A process according to claim 20 wherein the additional layer is applied to the reinforced product by wrapping, braiding or helically winding said layer around or on said reinforced product.

27. A process according to claim 21 wherein the additional layer is applied to the reinforced product by wrapping, braiding or helically winding said layer around or on said reinforced product.

28. The product obtained by the process of claim 24.
29. The product obtained by the process of claim 25.
30. The product obtained by the process of claim 26.
31. The product obtained by the process of claim 27.

32. A process according to claim 1 wherein the reinforcing synthetic or natural fiber is applied to said tubing by wrapping, braiding or helically winding the aforesaid synthetic or natural fiber around or on said tubing.

* * * * *